United States Patent Office 3,642,947
Patented Feb. 15, 1972

3,642,947
PRODUCTION OF IMPACT-RESISTANT
MOLDING COMPOSITIONS
Dieter Stein, Limburgerhof, and Ludwig Bootz, Ludwigs-
hafen, Germany, assignors to Badische Anilin- & Soda-
Fabrik Aktiengesellschaft, Ludwigshafen (Rhine), Ger-
many
No Drawing. Filed Apr. 22, 1970, Ser. No. 30,950
Claims priority, application Germany, Apr. 25, 1969,
P 19 21 112.2
Int. Cl. C08f 41/12, 19/18
U.S. Cl. 260—876 R                                    7 Claims

ABSTRACT OF THE DISCLOSURE

Thermoplastic molding composition consisting of a rigid component A and an elastomeric component B. Component A is a solution or suspension graft polymer of styrene and acrylonitrile on a butadiene rubber. Component B is an emulsion graft polymer of styrene and acrylonitrile on an acrylic ester rubber. The molding compositions are characterized by high impact resistance at room temperature, good rigidity and satisfactory impact resistance at low temperatures. They may be used, for example, in the manufacture of plastics parts for automobiles.

This invention relates to thermoplastic molding compositions of improved impact resistance at low temperatures and consisting of mixtures of a rigid component A, which consists of rubber-modified styrene/acrylonitrile copolymers, and an elastomeric component B, which consists of graft polymers of styrene and acrylonitrile on acrylic ester polymers.

Thermoplastic molding compositions comprising copolymers of styrene and acrylonitrile are distinguished by improved solvent resistance as compared with pure polystyrene, but they are relatively brittle. It is known that the toughness of styrene polymers may be improved by incorporating a rubber having a low glass temperature, e.g. German printed application No. 1,495,089 proposes a method of improving the impact resistance of styrene/acrylonitrile copolymers by graft polymerizing a solution of rubber in styrene and acrylonitrile. When the rubber content rises above 15%, however, the solution becomes so viscous that polymerization on a commercial scale is not possible. There is consequently a limit to the extent to which the impact resistance can be improved by increasing the proportion of rubber in graft polymerization.

Neither is it possible to improve the impact resistance by mechanically blending in further quantities of rubber into the rubber-modified styrene/acrylonitrile copolymer. Non-polar rubbers such as conventional butadiene polymers are not very compatible with the rubber-modified styrene/acrylonitrile copolymers and, as a result, the mechanical properties and gloss are impaired. Compatibility with polar rubbers such as butadiene/acrylonitrile copolymers is better, but such rubbers have such a high glass temperature that there is no appreciable improvement in impact resistance at low temperatures.

The German patent specifications Nos. 1,138,921; 1,-238,207 and 1,260,135 disclose formulations consisting of a rigid and brittle styrene/acrylonitrile copolymer and and elastomeric graft polymer of styrene and acrylonitrile on various acrylic ester polymers. Molding compositions of this kind are distinguished by high gloss and excellent rigidity. Their impact resistance at room temperature is adequate for most requirements, but at temperatures below freezing point their impact resistance diminishes rapidly with the result that the molding compositions cannot be used, for example, for low-temperature applications.

It is therefore an object of the invention to provide molding compositions based on copolymers of styrene and acrylonitrile which exhibit satisfactory low-temperature impact resistance in addition to high impact resistance at room temperature and satisfactory rigidity.

We have now found that thermoplastic molding compositions made up of (A) from 95 to 65% by weight of a rigid component obtained by solution or suspension graft polymerization of from 90 to 60 parts by weight of styrene, from 10 to 40 parts by weight of acrylonitrile and from 0 to 50 parts by weight of further comonomers in the presence of from 2 to 15 parts by weight of a rubber having a glass temperature below −80° C., and (B) from 5 to 35% by weight of an elastomeric component obtained by emulsion graft polymerization of from 10 to 50 parts by weight of a mixture of styrene and acrylonitrile in a ratio of from 60:40 to 90:10 by weight in the presence of 100 parts by weight of a copolymer of from 100 to 40 parts by weight of an alkyl acrylate in which the alkyl radical contains from 4 to 12 carbon atoms, from 0 to 60 parts by weight of butadiene and from 0 to 20 parts by weight of further comonomers, have excellent low-temperature impact resistance.

The rigid component A is made in the usual manner by graft polymerizing styrene and acrylonitrile in the presence of a rubber. In addition to styrene and acrylonitrile, other comonomers which are copolymerizable therewith, such as methyl methacrylate or nuclear-methylated styrenes, may be incorporated. The rubber used must have a glass temperature of less than −80° C. By glass temperature we mean the temperature range in which the translational or rotational motion of chain sections of a high molecular weight substance freeze (cf. E. Jenckel and H. A. Stuart, Physik der Hochpolymeren, vol. IV, p. 566 (1956)). An example of such a rubber is polybutadiene obtained by polymerizing butadiene with alkali alkyls, for example lithium butyl, or with Ziegler catalysts. Copolymers of butadiene with small quantities of styrene are also useful, as are also block polymers of butadiene and styrene.

2 to 15, preferably 5 to 12, parts by weight of rubber are used per 100 parts by weight. The graft polymerization of styrene and acrylonitrile onto the rubber may be carried out in aqueous suspension, in bulk or in the presence of inert solvents, e.g. 5 to 30%, based on the total solution, of an alkyl aromatic, for example ethylbenzene.

A preferred procedure is to make the rigid component A by the method disclosed in the German printed application No. 1,495,089, in which styrene and acrylonitrile are graft polymerized in the presence of a butadiene polymer which has a K value of from 65 to 140, 90% or more of which has 1,4-structure and more than 30% of which has cis-configuration. Graft polymerization is carried out between 60° and 170° C., preferably between 100° and 160° C., advantageously in a plurality of stages. It may be initiated either thermally or by means of initiators, such as azo compounds or peroxides. Furthermore, during the polymerization there may be added conventional regulators, such as dodecyl mercaptan or dimeric α-CH$_3$ styrene, stabilizers, such as di-tert-butyl-p-cresol, and lubricants, such as paraffin oils.

The elastomeric component B is prepared by graft polymerizing from 10 to 50 parts by weight of a styrene/acrylonitrile mixture in an aqueous emulsion of 100 parts by weight of an acrylic ester polymer. By acrylic ester we mean an ester of acrylic acid with a linear or, at most, single-branched alkyl alcohol having from 4 to 12 carbon atoms. The acrylic ester polymer may be an acrylic ester homopolymer, which may be partially or completely cross-linked by copolymerization with a non-conjugated diene. Copolymers of acrylic esters with up to 60% by weight of butadiene are also useful. However, it is preferred to use a terpolymer derived from 30 to 77% by weight of butyl acrylate or ethylhexyl acrylate, from 20 to 40% by weight of butadiene and from 3 to 20% by weight of vinyl alkyl ether, in which the alkyl radical contains from 1 to 4 carbon atoms, as described in German Pat. No. 1,238,207. Graft polymerization of component B is carried out by adding a mixture of styrene and acrylonitrile monomers mixed in a ratio of from 60:40 to 90:10 by weight to an aqueous emulsion of the acrylic ester polymer. If desired, further emulsifying agents may be added during the process. The polymerization is initiated by free radical-forming initiators, such as azo compounds or peroxides. The polymerization may be carried out at temperatures ranging from 50° to 100° C. In this case, too, conventional auxiliaries, such as regulators and stabilizers, may be added.

Components A and B are mixed at temperatures of from 180° to 260° C. in conventional processing equipment, such as extruders, mixing rolls or kneader mixers. If desired, there may be added further additives during mixing, for example fillers, pigments, stabilizers and lubricants.

The advantages according to the invention are obtained when the total blend contains from 5 to 35%, preferably from 5 to 30%, by weight of the elastomeric component B. The resulting molding compositions are easy to process by methods usually used for processing thermoplastics. Their impact resistance at room temperature is good and, compared with similar products, their low-temperature impact resistance is much improved.

The invention is illustrated by the following examples in which parts and percentages are by weight.

The K values were measured by German Standard Specification No. 53,726 in a 1% solution in toluene at 25° C.

The viscosity numbers $\eta_{sp}/c$. in $cm.^3 \times g.^{-1}$ were determined in 0.5% solution in methyl ethyl ketone. Insoluble gel portions were removed before measurement by centrifuging and were taken into account when weighing the total polymer.

The impact resistance of the products was determined by the so-called falling dart impact test. Circular discs having a diameter of 50 mm. and a thickness of 1 mm. were injection molded at a composition temperature of 260° C. The damage caused to a disc by the falling dart in a biaxial penetration test was measured in cm.×kg.

The acrylonitrile content was measured by determining the nitrogen content by the method proposed by Kjeldahl.

EXAMPLE 1

(A) A solution of 6.4 parts of a polybutyladiene (having a fraction of 35% in 1,4-cis-configuration and a K value of 96) in 51 parts of styrene, 17 parts of acrylonitrile and 25.5 parts of ethyl benzene is mixed with 0.05 part of 2-6-tert-butyl-p-cresol as stabilizer and 0.07 part of tert-dodecyl mercaptan as regulator. This mixture is polymerized in 6 reaction zones with stirring until the solids content is 64%. The temperatures and residence times in the various reaction zones are as follows:

| Zone: | Temperature (° C.) | Residence time (hr.) |
|---|---|---|
| 1 | 73–78 | 1.5 |
| 2 | 108–113 | 1.75 |
| 3 | 99–104 | 2 |
| 4 | 109–113 | 1.5 |
| 5 | 124–128 | 2 |
| 6 | 112–116 | 3.5 |

The reaction mixture discharged from the reaction sustem is heated in a heat exchanger to a temperature of from 220° to 240° C. and then expanded into a vessel at from 10 to 20 mm. Hg, where ethyl benzene and unreacted monomers are extracted as vapors. The molten polymer is discharged from the vacuum vessel and granulated. The dissolved granules have a viscosity number of 74.

For a comparative test 100 parts of the granulated material prepared under (A) above are mixed with 1 part of butyl stearate and then neaded thoroughly under nitrogen in a Ko-Kneader at a temperature of from 230° to 250° C. and a residence time of about 3 minutes. The resulting product is ground, and the milled product is melted in a single-screw extruder and uniformly granulated.

The total rubber content of the mixture is 9.9%. The following values for the impact resistance of this product are obtained in the falling-dart impact test: 3.8 at −40° C.; 10.1 at +20° C.; acrylonitrile content 22%.

(B) 4 parts of vinyl methyl ether, 15 parts of butyl acrylate and 15 parts of butadiene are heated to 65° C. with stirring in 150 parts of water while adding 1.2 parts of the sodium salt of a paraffin sulfonic acid ($C_{12}$–$C_{18}$), 0.3 part of potassium persulfate, 0.3 part of sodium bicarbonate and 0.15 part of sodium pyrophosphate. After polymerization has started, a mixture of 43 parts of butyl acrylate and 23 parts of butadiene is added in the course of 5 hours. After all monomers have been added, the polymerization mixture is kept at 65° C. for a further 2 hours. There is then obtained an approximately 40% aqueous polymer dispersion. 250 parts of this dispersion are mixed with 25 parts of a mixture of styrene and acrylonitrile (ratio 75:25 by weight) and 37.5 parts of water and polymerized at 70° C. with stirring. 0.05 part of potassium persulfate and 0.075 part of lauroyl peroxide, both dissolved in the styrene/acrylonitrile mixture, are used as polymerization initiators. An approximately 40% aqueous polymer dispersion is obtained. Precipitation is effected with 0.5% aqueous calcium chloride solution, and the precipitate is washed and then dried in vacuo at 60° C.

(C) 70 parts of the granules made under (A) above are mixed with 30 parts of the powder made under (B) above and with 1 part of butyl stearate, and the mixture is then kneaded in a Ko-Kneader. The product is remelted and granulated. The total rubber content of the mixture is 29.5%. The following values for the impact resistance of the product are obtained in the falling-dart impact test: 34.0 at −40° C.; 240 at +20° C.; acrylonitrile content 17%.

EXAMPLE 2

When 80 parts of the granules 1 A are mixed with 20 parts of the powder 1 B and 1 part of butyl stearate, the total rubber content is 23% and the following values are obtained in the falling-dart impact test:

Impact resistance: 8.1 at −40° C.; 131 at +20° C.; Acrylonitrile content: 19.5%.

EXAMPLE 3

Comparative example 65 parts of a copolymer of 65% styrene and 35% acrylonitrile (viscosity number 60) are mixed with 35 parts of the powder made in Example 1 (B) and 1 part of butyl stearate, and the mixture is prepared for testing. The total rubber content is 26.5%. The following impact resistance values are obtained: 1.3 at −40° C.; 124 at +20° C.; acrylonitrile content 25.3%.

EXAMPLE 4

(A) A solution of 8.5 parts of a polybutadiene (having a fraction of 33% in 1,4-cis-configuration and a K value of 94) in 52 parts of styrene, 17 parts of acrylonitrile and 21 parts of ethyl benzene is prepared and 0.04 part of 2,6-di-tert-butyl-p-cresol, 0.06 part of tert-dodecyl mercaptan and 1.5 parts of glycerol monostearate are added. The solution is polymerized as in Example 1 (A) to a solids content of from 70 to 71% and is then freed from volatiles.

The following values are obtained for the resulting granules:

Viscosity number: 82
Acrylonitrile content: 21%
Falling-dart impact resistance:
 3.7 at −40° C.
 5.9 at +20° C.

(C) 90 parts of the granules A are mixed with 10 parts of the powder made in Example 1 (B). The following values are obtained for the resulting granules which have a total rubber content of 18.3%:

Acrylonitrile content: 20%
Falling-dart impact resistance:
 13.4 at −40° C.
 105 at +20° C.

EXAMPLE 5

70 parts of the granules produced in Example 4 (A) are mixed with 30 parts of the powder made in Example 1 (B). The following values are obtained for the resulting granules which have a total rubber content of 30.9%:

Acrylonitrile content: 17.1%
Falling-dart impact resistance: 74 at −40° C.

EXAMPLE 6

Comparative example 70 parts of the granules produced in Example 4 (A) are mixed with 30 parts of a polybutadiene which has a K value of 93 and of which 36% has 1,4-cis-configuration. The following values are obtained for the resulting granules which have a total rubber content of 37%:

Falling-dart impact resistance:
 4.2 at −40° C.
 3.1 at +20° C.

EXAMPLE 7

(A) A solution of 6.4 parts of a polybutadiene (having 1,4-cis-configuration to the extent of 33% and a K value of 94) in 37.5 parts of styrene, 14.8 parts of acrylonitrile, 14.8 parts of methyl methacrylate and 26.3 parts of ethyl benzene is prepared and 0.04 part of 2,6-di-tert-butyl-p-cresol and 0.06 part of tert-dodecyl mercaptan are added. The solution is polymerized as described in Example 1 (A) to a solids content of 67% and then freed from volatiles. The following values are obtained for the resulting granules:

Viscosity number: 62
Acrylonitrile content: 18.5%
Methyl methacrylate content: 19.7%
Falling-dart impact resistance:
 5.4 at −40° C.
 18.6 at +20° C.

(C) 70 parts of the granules obtained under (A) above are mixed with 30 parts of the powder made in Example 1 (B). The total rubber content of the resulting granules is 29.5%. The following values are obtained:

Falling-dart impact resistance:
 62 at −40° C.
 153 at +20° C.

We claim:
1. A thermoplastic molding composition comprising a mixture of
 (A) from 95 to 65% by weight of a rigid component obtained by solution or suspension graft polymerization of from 90 to 60 parts by weight of styrene, from 10 to 40 parts by weight of acrylonitrile and from 0 to 50 parts by weight of other comonomers in the presence of from 2 to 15 parts by weight of a polybutadiene having a K value of from 65 to 140 and having 1,4-structure to the extent of more than 90% and a cis-configuration to the extent of more than 30%
 (B) from 5 to 35% by weight of an elastomeric component obtained by emulsion graft polymerization of from 10 to 50 parts by weight of a mixture of styrene and acrylonitrile in a ratio of from 60:40 to 90:10 by weight in the presence of 100 parts by weight of a terpolymer of 30 to 77% by weight of butyl acrylate, 20 to 40% by weight of butadiene and 3 to 20% by weight of vinyl alkyl ether in which the alkyl radical contains from 1 to 4 carbon atoms.

2. A molding composition as claimed in claim 1 containing from 85 to 70% by weight of the rigid component A and from 15 to 30% by weight of the elastomeric component B.

3. A molding composition as claimed in claim 1 wherein the component A contains as copolymerizable monomer up to 50 parts by weight of methyl methacrylate.

4. A molding composition as claimed in claim 1 wherein the component A contains from 5 to 12 parts by weight of said polybutadiene.

5. A molding composition as claimed in claim 1 wherein the component A is prepared by graft polymerization at temperature between 60° and 170° C.

6. A molding composition as claimed in claim 1 wherein the component A is prepared by graft polymerization at temperatures between 100° and 160° C.

7. A molding composition as claimed in claim 1 wherein the component B is prepared by graft polymerization at temperatures between 50° and 100° C.

References Cited

UNITED STATES PATENTS

| 3,502,744 | 3/1970 | Weitzel et al. | 260—876 |
| 3,280,219 | 10/1966 | Siebel et al. | 260—876 |
| 3,041,307 | 6/1962 | Baer | 260—876 |
| 3,354,108 | 11/1967 | Paradis et al. | 260—880 X |
| 3,542,904 | 11/1970 | Weitzel et al. | 260—876 |

FOREIGN PATENTS

| 1,495,089 | 1/1969 | Germany. | |
| 661,134 | 4/1963 | Canada | 260—876 |
| 1,124,345 | 8/1968 | Great Britain | 260—876 |

MURRAY TILLMAN, Primary Examiner

H. ROBERTS, Assistant Examiner

U.S. Cl. X.R.

260—876 B, 880 R, 880 B

PO-1050
(5/69)

UNITED STATES PATENT OFFICE
CERTIFICATE OF CORRECTION

Patent No. 3,642,947            Dated February 15, 1972

Inventor(s) Dieter Stein and Ludwig Bootz

It is certified that error appears in the above-identified patent and that said Letters Patent are hereby corrected as shown below:

Column 3, line 28, "5 to 30%" should read -- 15 to 30% --;
line 54, "polybutyladiene" should read -- polybutadiene --;
line 73, "sustem" should read -- system --.

Column 4, line 7, "neaded" should read -- kneaded --.

Signed and sealed this 25th day of July 1972.

(SEAL)
Attest:

EDWARD M. FLETCHER, JR.        ROBERT GOTTSCHALK
Attesting Officer                Commissioner of Patents